United States Patent [19]

Düll

[11] 4,303,017
[45] Dec. 1, 1981

[54] LONG STATOR LINEAR MOTOR WITHOUT IRON

[75] Inventor: Hans-Jürgen Düll, Langensendelbach, Fed. Rep. of Germany

[73] Assignee: Siemens Aktiengesellschaft, Berlin and Munich, Fed. Rep. of Germany

[21] Appl. No.: 35,343

[22] Filed: May 2, 1979

[30] Foreign Application Priority Data

May 12, 1978 [DE] Fed. Rep. of Germany ....... 2820888

[51] Int. Cl.³ .................. H02K 41/02; B61B 13/00
[52] U.S. Cl. .................................. 104/294; 104/290; 310/12; 318/135; 336/205; 336/207
[58] Field of Search ............. 104/148 LM, 148 MS, 104/148 SS, 286, 290, 292, 294; 310/12, 13; 318/135, 687; 336/205, 207; 29/605

[56] References Cited

U.S. PATENT DOCUMENTS

| | | | |
|---|---|---|---|
| 2,469,099 | 5/1949 | Andrus | 336/205 X |
| 2,595,729 | 5/1952 | Swiss et al. | 29/605 |
| 3,746,899 | 7/1973 | Eastham | 104/294 X |
| 3,806,782 | 4/1974 | Matsui et al. | 104/148 LM X |
| 3,834,014 | 9/1974 | Burr et al. | 29/605 X |
| 3,836,799 | 9/1974 | Eastham et al. | 104/148 LM X |
| 3,850,109 | 11/1974 | Thornton | 104/148 SS |
| 4,053,975 | 10/1977 | Olbrich et al. | 310/13 X |
| 4,131,811 | 12/1978 | Apsit et al. | 104/148 LM X |

FOREIGN PATENT DOCUMENTS 2303188 8/1973 Fed. Rep. of Germany ...... 104/148 MS
2721905 11/1978 Fed. Rep. of Germany ........ 310/12

*Primary Examiner*—Randolph A. Reese
*Attorney, Agent, or Firm*—Kenyon & Kenyon

[57] ABSTRACT

In winding the stator of a long stator linear motor without iron, the conductors of the traveling wave winding in the stator are designed as round jacketed lines which are fixed to a non-magnetic winding support by crossbars and retained in place by hardenable non-magnetic material. The conductors of the traveling wave winding are approximately flush with the outside surface of the stator which is disposed opposite an exciter magnet on a moving vehicle.

12 Claims, 6 Drawing Figures

LONG STATOR LINEAR MOTOR WITHOUT IRON

BACKGROUND OF THE INVENTION

This invention relates to linear motors in general, and more particularly, to a linear motor for propelling track bound vehicles.

A linear motor having a stator disposed on a track, which stator is provided with devices for its retention on the railbed and which has conductors of a traveling wave winding imbedded in a non-magnetic winding support, is disclosed in U.S. Pat. No. 3,924,537. As described therein, two exciter windings having horizontal coil axes are disposed on a vehicle. A traveling wave winding consisting of electrical conductors of rectangular cross section is disposed on the railbeds and cooperates with the exciter windings on the vehicle. The space between and around the electrical conductors on the roadbed is filled with an electrical insulator of epoxy resin, polyester resin or the like in such a way that a rail is formed. The conductors are brought out at the two ends of the rail permitting rails which are lined up to be connected together. The rails, after being lined up, are secured to the roadbed in an up-ended manner utilizing an intermediate support and protrude between the two windings of the exciter magnet which is disposed on the vehicle. A particular disadvantage of this design is that track elements which are cantilevered are employed. These cause difficulties particularly at track crossings and junctions.

A simple construction of the railbed and of switches can be achieved by using a single-sided linear motor which has an exciter winding disposed on the vehicle with the vertical coil axis, along with the multi-phase traveling wave winding arranged flat on the railbed for the drive of the vehicle. Such is disclosed in the publication, "Research and Development on Electrodynamic Levitation in West Germany" AEG-BBC-Siemens, Catalog No. E 41 PM/1393, page 15. In such a design, the line is divided into individual feed sections and possesses a star-connected three-phase current winding fed by a static frequency changer subunit. A superconducting exciter winding on the vehicle cooperates with the three-phase winding accomodated in the track.

SUMMARY OF THE INVENTION

It is the object of the present invention to provide a long stator linear motor without iron for use in propelling a track-bound vehicle which contains the conductors of a traveling wave winding on the railbed so that, at a minimum of installation cost, the conductors will lie as close as possible to the air gap side of the linear motor, while at the same time, permitting a durable attachment of the conductors to the roadbed with correct positioning.

Starting with the linear motor of the general type mentioned above, the present invention solves this problem by designing a flat stator arrangement disposed on the railbed using insulated, approximately round jacketed lines as conductors for the traveling wave winding. The conductors are singly fixed in a form by retention means in such a way that, after pouring in hardening material, they are approximately flush with the outside of the stator opposite the exciter magnet of the linear motor. The jacketed lines, which are approximately round, can be bent into the required shape for formation of the traveling wave winding without special tools and can be securely mounted in the hardening material at the top-side of the stator. The material which is hardened, need only have good mechanical strength properties, but not electrical insulating properties. In contrast to known designs, intermediate supports for the attachment of the stator on the railbed are not necessary, thereby lowering production costs.

It is particularly advantageous to use slabs for the lower portion of the form which are lined up and function as the railbed. These slabs constitute lost form winding supports of partial stators. Another type of lost form which may be used as a recessed track support may consist of a material such as concrete. Using concrete, the production of a long stator linear motor is greatly simplified, and installation at the site is facilitated because prefabricated railbed parts, into which the jacketed lines are then inserted as long conductors, can be used in the construction of the stator. As a result, line connections are generally necessary only at the beginning and end of a feed section.

DETAILED DESCRIPTION OF THE INVENTION

Figure 1:
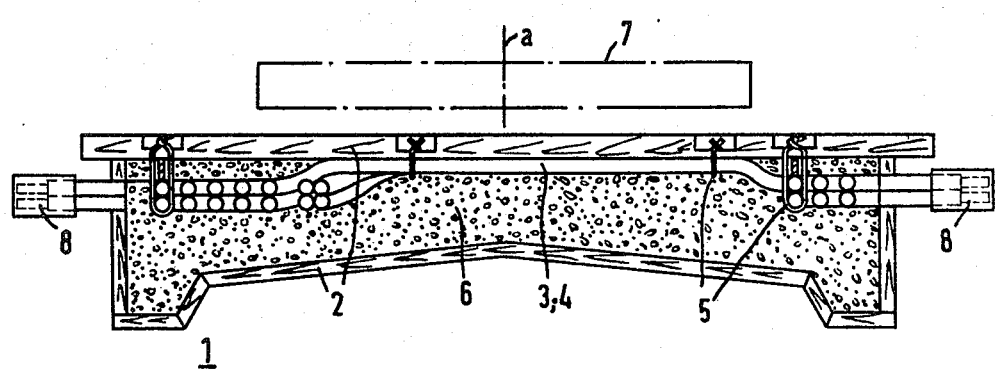
FIG. 1 shows a transverse section of a long stator of a linear motor made in a form.

FIG. 1 is a transverse section of a stator 1 according to the present invention. In the embodiment of FIG. 1 the stator is produced in a horizontal or upright form 2 and designed so that it can be arranged flat on the railbed. Insulated and approximately round jacketed lines 4 are used as conductors for the traveling wave winding 3. The round jacketed lines are fixed in form 2 by means of retention means 5. The jacketed lines 4 of the traveling wave winding constitute a wiring harness which is fastened to the wall of the form 2 by means of wires which are detachable from the outside in such a way, that after injecting a hardenable non-magnetic material 6, they are approximately flush with the outside of the stator 1 which is opposite the exciter magnet 7 of the linear motor. The winding axis a of exciter magnet 7 is perpendicular to the railbed. The hardenable material may be concrete or another material which will harden, i.e., will set or cure. Stator 1 of FIG. 1 is removed from its form 2 after hardening and is transported to the site. A plurality of stators 1 are laid flat on the railbed and are lined up to form a rail. The individual sections of the traveling wave windings 3 are connected together in an electrically conducting manner at respective ends 8 which are brought out at both sides of the stators 1.

Figure 2:
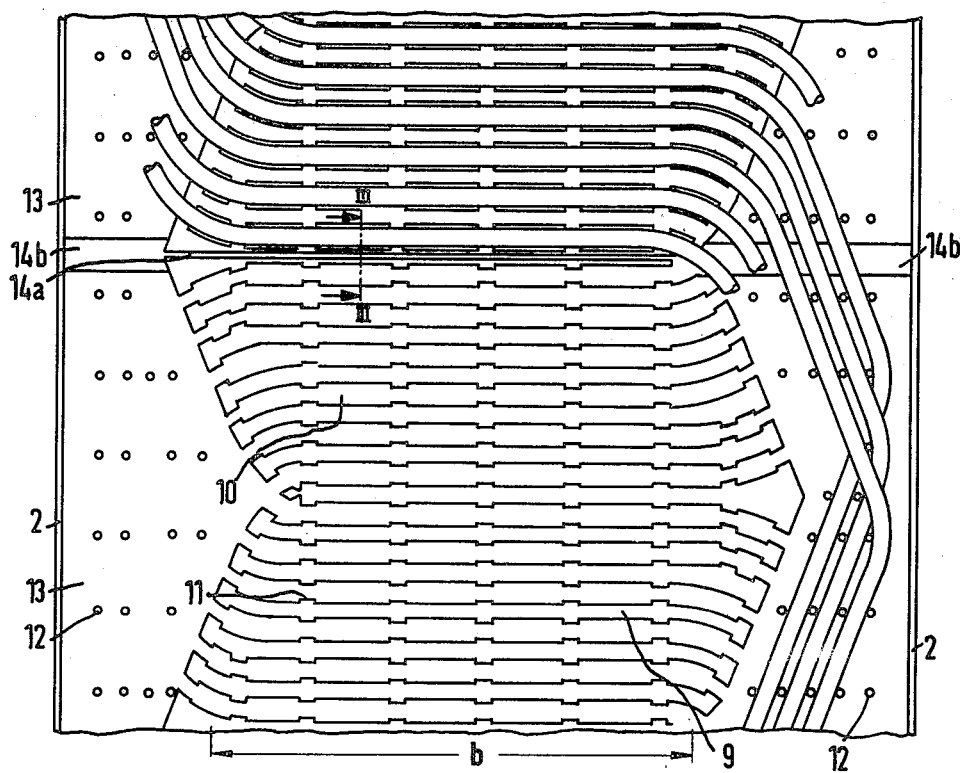
FIG. 2 shows a top view of a long stator provided with retention means for a traveling wave winding.

FIG. 2 shows the manner in which pre-fabricated winding supports 13, which remain on the roadbed as lost forms, may be used to form the long stator of the linear motor of the present invention. In the embodiment illustrated by FIG. 2 it is expedient to use crossbars 9, shown in cross-section in FIG. 3, as alternates to retention means 5 in FIG. 1 for the generally round jacketed lines. In particular, cross-bars 9 should be made of a non-magnetic material and form slots 10 which are used for fixing the jacketed lines 4 into the forms. Through the use of the cross-bars 9, the formation of jacketed lines 4 into traveling wave windings is facilitated. Preferably, cross-bars 9 extend approximately over the width of the active stator. In order to provide retention means at the winding heads, means preferably in the form of rods 12 between which the jacketed lines 4 are clamped are provided. In order to obtain a clamped fit of the jacketed lines which lie between the cross-bars 9, the cross-bars 9 contain projections 11 at intervals which narrow the slots.

Figure 3:
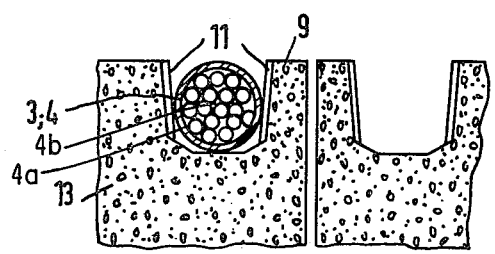
FIG. 3 is a partial cross-section relating to FIG. 2 along line III—III.

It is preferred that the jacketed lines of the traveling wave winding 3 be made up of a multiple core conductor, i.e., of a plurality of individual conductors 4b inside an insulating sheath 4a as shown in detail in FIG. 3. This provides the advantage of facilitating the insertion of the lines into the form when the winding is being constructed. Furthermore, such a multi-conductor line is a considerable aid in decreasing braking losses. The winding shown on FIGS. 2 and 3 is a single layer winding. Such is preferred because it keeps the distance between a plane cutting through the center of the jacketed lines 4 and the exciter magnet in the vehicle at a minimum. With a multi-layer winding, the average distance between the winding and the exciter coils would, of course, be increased.

During construction, the jacketed lines can be placed onto the winding supports 13 as they are being unwound from cable drums, and then fixed in placed, as is shown in FIG. 2. With such a construction, no connecting points between feed points are needed. After an initial electrical testing of the windings, the winding supports 13 are provided with a lateral form 2 and, for final fixation of the winding, a hardenable material is poured over the windings thereby filling in opened spaces existing between the forms 2. In particular, a hardening synthetic resin compound can be poured in. Joint 14a is provided between adjacent winding supports 13 and is shown in the area of the winding head as enlarged joint 14b. An elastic compound is injected into these joints to accommodate for thermal expansion of the winding supports 13.

Rods 12 which are disposed in the winding support 13 hold the conductors in place and also serve to reinforce the synthetic resin compound and thereby improve the strength of the overall assembly. The cross-bars 9 fix the jacketed lines and provide a strong mechanical connection with the winding support 13. Such a strong mechanical connection is important because during operation of the linear motor, the resin compound which has been poured in is predominantly under compressive and shearing stress. Tensile stresses, however, are almost entirely avoided as will be evident from an examination of FIG. 3. Moreover, by using the cross-bars 9, less resin compound is required to retain the jacketed lines in place than in an arrangement without cross-bars.

When using a resin compound for attachment of the jacketed lines of a single layer traveling wave winding 3, the arrangement of the present invention also permits subsequent removal of the individual jacketed conductors by heating the respective conductor. Thus, should mechanical damage occur, repairs are possible without renewing the entire railbed section. As an alternative to the use of cross-bars and rods 12, for retention of the round jacketed lines on the winding support 13 between the forms 2, an adhesive, in particular a contact adhesive, may be used.

Figure 4:
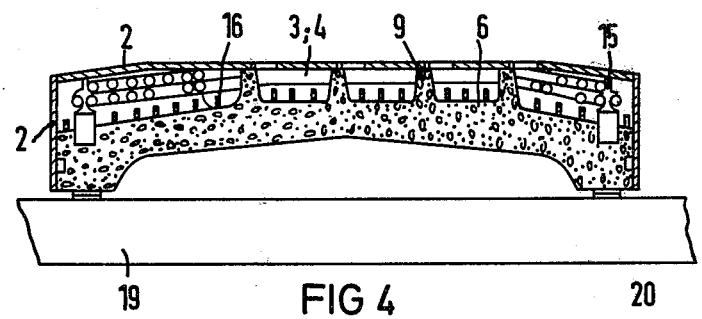
FIG. 4 is a transverse section of a stator which is made with the use of a lost lower form.
Figure 5:
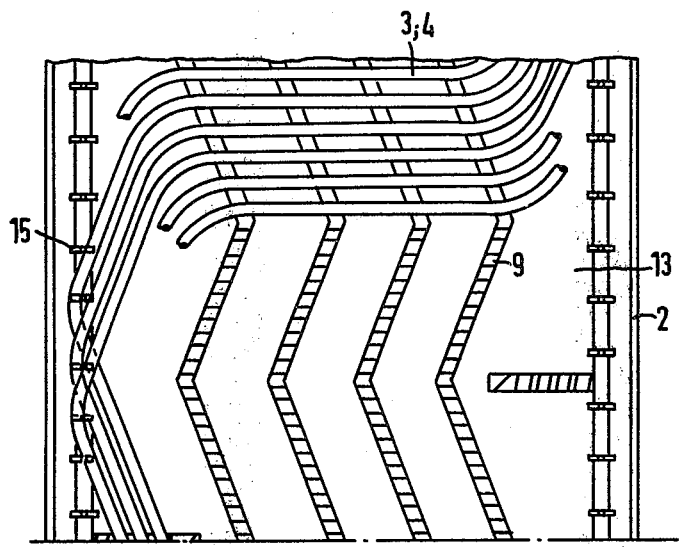
FIG. 5 is a top view of the stator shown in FIG. 4, with the upper form removed.

FIGS. 4 and 5 show an embodiment in which cross-bars 9, which are used for retaining the traveling wave winding 3, extend over only small partial areas of the stator width b in FIG. 2. Such a construction is particularly expedient when the same material, e.g., concrete mortar, is used for sealing the traveling wave winding as is used for the lost form which acts as the winding support 13. In this embodiment, hooks 15 are used as retention means for the traveling wave winding 3 at the winding head of the stator 1. Rods 16 are used as reinforcement and also improve the mechanical connection between the winding support 13 and the material used for sealing.

Figure 6:
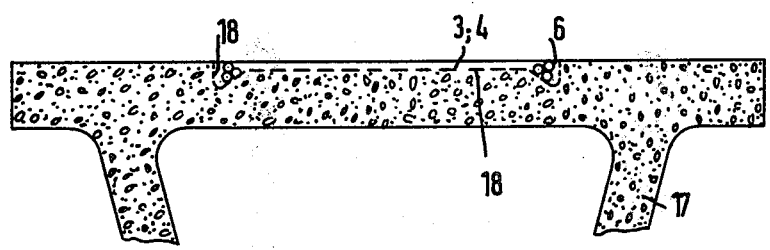
FIG. 6 is a stator in which a recessed track support serves as the form.

FIG. 6 depicts another embodiment of the invention and illustrates a stator disposed in a recess 18 in a track support 17 which functions as the form for the winding 3. Cross-bars, pins or hooks for fixing the jacketed lines 4 extend into the recess 18, which is then filled with a hardenable material 6 for fixing the jacketed lines 4 of the winding 3 in place.

In all embodiments, it is preferred that a good heat conducting material be added to the hardenable material 6.

Although the inventive concept disclosed herein has been described in terms of specific embodiments and applications, other applications and embodiments will be obvious to persons skilled in the art without departing from the spirit and scope of the invention.

What is claimed is:

1. A linear motor stator adapted to be disposed on a track and to cooperate with a vehicle containing an excitation winding comprising:
   (a) a form for the stator for defining a space having a preselected cross-sectional configuration suitable for placement on a track roadbed;
   (b) a plurality of electrically conductive lines, each such line having at least one electrically conductive element surrounded by an insulating jacket;
   (c) non-magnetic retention means in said form for fixing each of said lines individually within said space defined by said form in a position which produces a substantially flat traveling wave stator winding, portions of each of said lines being disposed adjacent and parallel to a surface plane of said form; and
   (d) a non-magnetic material which is poured while in a fluid state into said form so as to occupy the remaining space defined therein, and which hardens to further fix said lines in said position fixed by said retention means.

2. A linear motor stator according to claim 1 wherein there are further provided a plurality of said forms and precast slabs for providing at least a lower portion of respective ones of said forms, said slabs being lined up on said track roadbed as lost forms.

3. A linear motor stator according to claim 2 wherein said lines are continuously formed into said stator winding on a prealigned winding support.

4. A linear motor stator according to claim 1 wherein said non-magnetic retention means for said lines comprise cross-bars disposed side-by-side in said form, for forming slots in which respective portions of said lines are positioned.

5. A linear motor stator according to claim 4 further including projections in said cross-bars at preselected intervals, said projections narrowing said slots for securing said portions of said lines in said form.

6. A linear motor stator according to claim 1 wherein said lines comprise multi-wire conductors wrapped with a common insulating sheath.

7. A linear motor stator according to claim 1 wherein said retention means for said lines comprise a selectable one of rods and hooks.

8. A linear motor stator according to claim 1 wherein said retention means comprises an adhesive.

9. A linear motor stator according to claim 1 wherein said form comprises track supports which are lined up along said track roadbed, said track supports having a recessed portion for containing said traveling wave winding.

10. A linear motor stator according to claim 1 wherein there is further provided a heat conductive material which is added to said non-magnetic material.

11. A linear motor stator according to claim 1 wherein said lines are continuously formed into said stator winding on a prealigned winding support.

12. A linear motor stator according to claim 1 wherein said stator winding is a single layer winding.

* * * * *